United States Patent
Nakamatsu et al.

(10) Patent No.: US 12,135,084 B2
(45) Date of Patent: Nov. 5, 2024

(54) DRIVE APPARATUS

(71) Applicant: NIDEC CORPORATION, Kyoto (JP)

(72) Inventors: Shuhei Nakamatsu, Kyoto (JP); Shinsuke Mizukami, Kyoto (JP); Tsubasa Tamura, Kyoto (JP); Keisuke Aso, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/536,101

(22) Filed: Dec. 11, 2023

(65) Prior Publication Data

US 2024/0102556 A1 Mar. 28, 2024

Related U.S. Application Data

(63) Continuation of application No. 17/392,260, filed on Aug. 3, 2021, now Pat. No. 11,873,897.

(30) Foreign Application Priority Data

Aug. 12, 2020 (JP) ................. 2020-136250

(51) Int. Cl.
  *F16H 63/34* (2006.01)
  *F16H 57/04* (2010.01)
  *H02K 9/19* (2006.01)

(52) U.S. Cl.
  CPC ..... *F16H 63/3483* (2013.01); *F16H 57/0424* (2013.01); *F16H 57/0476* (2013.01); *F16H 63/3458* (2013.01); *H02K 9/19* (2013.01)

(58) Field of Classification Search
  CPC ............. F16H 57/0424; F16H 57/0476; F16H 57/045; F16H 57/0445; H02K 9/19
  See application file for complete search history.

(56) References Cited

U.S. PATENT DOCUMENTS

| | | | |
|---|---|---|---|
| 10,910,918 B2 * | 2/2021 | Nakamatsu | H02K 7/116 |
| 11,137,061 B2 * | 10/2021 | Ishikawa | F16H 57/0441 |
| 11,300,036 B2 | 4/2022 | Goto et al. | |

(Continued)

FOREIGN PATENT DOCUMENTS

| | | |
|---|---|---|
| JP | 2010190299 A | 9/2010 |
| JP | 2016176501 A | 10/2016 |

OTHER PUBLICATIONS

Nakamatsu et al.; "Drive Appratus", U.S. Appl. No. 17/392,260, filed Aug. 3, 2021.

*Primary Examiner* — Michael A Riegelman
(74) *Attorney, Agent, or Firm* — HAUPTMAN HAM, LLP

(57) ABSTRACT

A drive apparatus includes a motor that has a motor shaft extending in an axial direction, a transmission mechanism that is connected on one side in the axial direction of the motor shaft, a lock mechanism that restricts driving of the transmission mechanism, a housing that houses the motor, the transmission mechanism, and the lock mechanism, an oil that is stored in the housing, and an oil passage that circulates the oil. The housing includes a motor room that houses the motor, a gear room that houses the transmission mechanism and the lock mechanism, and a partition that is provided between the motor room and the gear room. The oil passage includes a pump that pumps the oil in the oil passage, a first feed flow passage that feeds the oil to the motor, and a second feed flow passage that feeds the oil to the lock mechanism.

18 Claims, 6 Drawing Sheets

(56) References Cited

U.S. PATENT DOCUMENTS

| | | | |
|---|---|---|---|
| 11,333,238 B2 | 5/2022 | Ishikawa et al. | |
| 11,502,579 B2 | 11/2022 | Nakamatsu | |
| 11,873,897 B2* | 1/2024 | Nakamatsu | F16H 63/3483 |
| 2009/0127954 A1* | 5/2009 | Mogi | F16H 57/0476 |
| | | | 310/90 |
| 2013/0145879 A1* | 6/2013 | Nakamura | F16H 57/0441 |
| | | | 74/467 |
| 2019/0178365 A1* | 6/2019 | Ishikawa | F16H 57/0493 |
| 2019/0181724 A1* | 6/2019 | Nakamatsu | H02K 1/32 |
| 2019/0186622 A1* | 6/2019 | Ishikawa | H02K 7/083 |
| 2019/0299769 A1* | 10/2019 | Li | H02K 5/20 |
| 2020/0266687 A1* | 8/2020 | Nakamatsu | H02K 7/116 |
| 2020/0300353 A1* | 9/2020 | Ishikawa | F16H 57/037 |
| 2022/0049768 A1* | 2/2022 | Nakamatsu | F16H 57/0424 |
| 2022/0099177 A1* | 3/2022 | Tamura | F16H 57/0495 |
| 2022/0123628 A1* | 4/2022 | Nakamatsu | H02K 7/116 |
| 2022/0173641 A1* | 6/2022 | Fujimoto | H02K 11/33 |
| 2022/0178442 A1* | 6/2022 | Matsuo | F16H 63/3433 |
| 2022/0196135 A1* | 6/2022 | Tamura | F16H 57/0426 |
| 2022/0205530 A1* | 6/2022 | Ishikawa | H02K 9/19 |
| 2022/0209619 A1* | 6/2022 | Fujimoto | H02K 7/10 |
| 2022/0282783 A1* | 9/2022 | Nakata | F16H 57/0424 |
| 2022/0282784 A1* | 9/2022 | Nakata | F16H 57/0424 |
| 2022/0282789 A1* | 9/2022 | Tamura | F16H 63/3433 |
| 2022/0286011 A1* | 9/2022 | Nakata | H02K 5/161 |
| 2022/0307586 A1* | 9/2022 | Fujimoto | F16H 57/0471 |
| 2022/0316582 A1* | 10/2022 | Inoue | F16H 57/043 |
| 2023/0067898 A1* | 3/2023 | Oki | F16H 57/0409 |
| 2023/0069613 A1* | 3/2023 | Osuga | H02K 7/083 |
| 2023/0082913 A1* | 3/2023 | Nakamatsu | F16H 57/021 |
| | | | 475/84 |
| 2023/0090548 A1* | 3/2023 | Ishikawa | H02K 5/203 |
| | | | 310/68 D |
| 2023/0261542 A1* | 8/2023 | Yamaguchi | F16H 63/3425 |
| | | | 310/54 |
| 2024/0102556 A1* | 3/2024 | Nakamatsu | F16H 57/0476 |

\* cited by examiner

DRIVE APPARATUS

CROSS-REFERENCE TO RELATED APPLICATIONS

This application is a continuation of U.S. patent application Ser. No. 17/392,260, filed Aug. 3, 2021, which claims priority under 35 U.S.C. § 119 to Japanese Patent Application No. 2020-136250 filed on Aug. 12, 2020, the disclosures of which applications are hereby incorporated by reference herein in their entirety.

FIELD OF THE INVENTION

The present invention relates to a drive apparatus.

BACKGROUND

In recent years, electric vehicles, hybrid vehicles, and the like using a motor unit as a drive source have begun to spread as environmentally friendly vehicles. A motor unit including a parking lock device is known as such a motor unit. A lock mechanism including a parking gear and a lock arm that meshes with a groove of the parking gear to prevent rotation of the parking gear is disclosed.

The lock mechanism of the structure of the related art is arranged so as to be immersed in an oil in an oil pool. Accordingly, the lock mechanism maintains a state in which the oil is sufficiently fed, and realizes smooth transition between a locked state and an unlocked state. Thus, the lock mechanism of the structure of the related art needs to be arranged in a lower region in a housing space in order to be immersed in the oil.

SUMMARY

One aspect of a motor unit of the present invention is a drive apparatus including a motor that has a motor shaft extending in an axial direction, a transmission mechanism that is connected on one side in the axial direction of the motor shaft, a lock mechanism that restricts driving of the transmission mechanism, a housing that houses the motor, the transmission mechanism, and the lock mechanism, an oil that is stored in the housing, and an oil passage that circulates the oil. The housing includes a motor room that houses the motor, a gear room that houses the transmission mechanism and the lock mechanism, and a partition that is provided between the motor room and the gear room. The oil passage includes a pump that pumps the oil in the oil passage, a first feed flow passage that feeds the oil to the motor, and a second feed flow passage that feeds the oil to the lock mechanism.

The above and other elements, features, steps, characteristics and advantages of the present disclosure will become more apparent from the following detailed description of the preferred embodiments with reference to the attached drawings.

DETAILED DESCRIPTION

Figure 1:
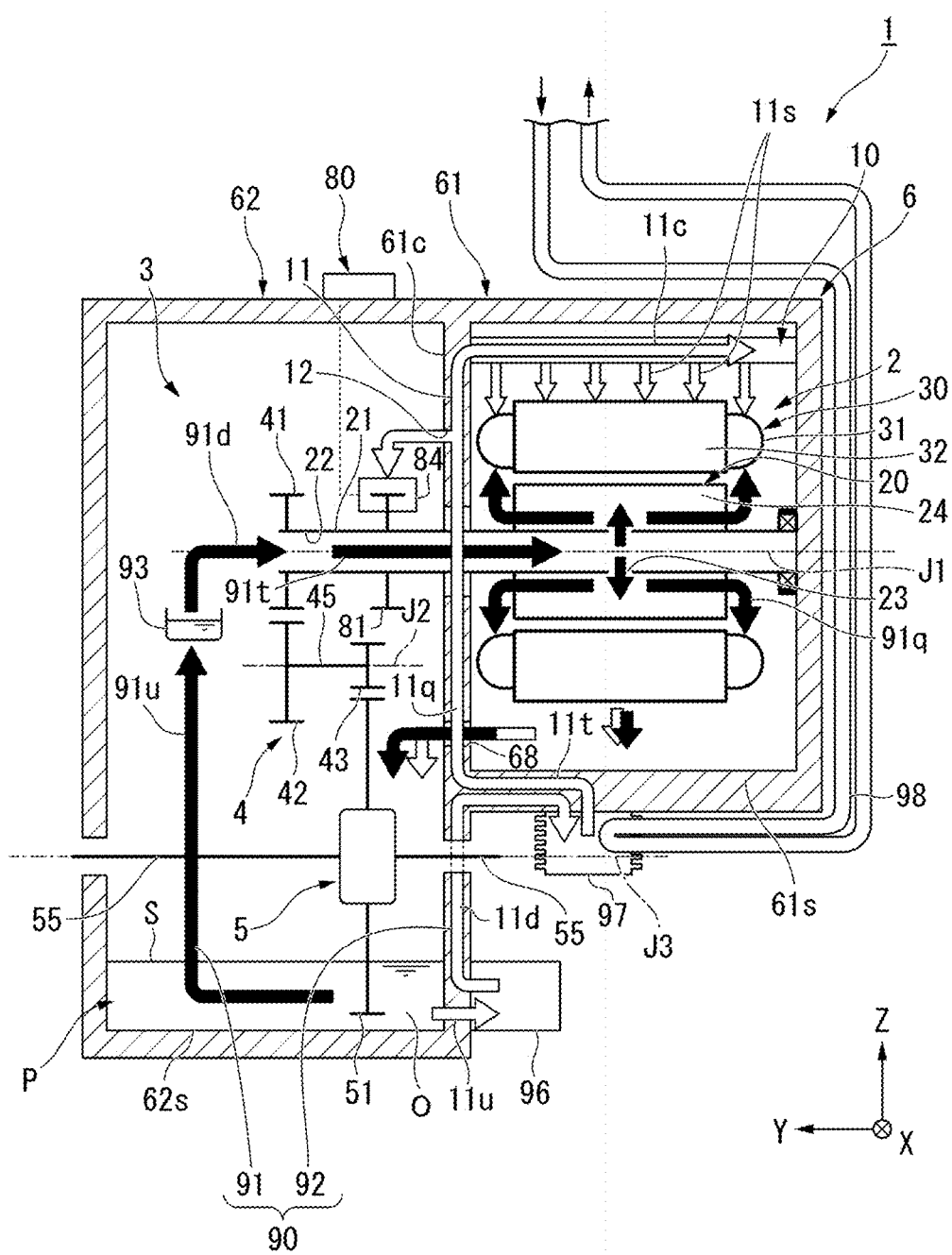
FIG. 1 is a schematic conceptual diagram of a motor unit (drive apparatus) according to an embodiment.

The following description will be made with a vertical direction being defined based on a positional relationship when a motor unit 1 according to the present preferred embodiment is mounted on a vehicle (not illustrated) positioned on a horizontal road surface. In the drawings, an XYZ coordinate system is shown appropriately as a three-dimensional orthogonal coordinate system. In the XYZ coordinate system, a Z-axis direction corresponds to the vertical direction. A +Z side corresponds to an upper side in the vertical direction, while a −Z side corresponds to a lower side in the vertical direction. In the present preferred embodiment, the upper side in the vertical direction will be simply referred to as the "upper side" and the lower side in the vertical direction will be simply referred to as the "lower side". An X-axis direction corresponds to a front-rear direction of the vehicle on which the motor unit 1 is mounted, and is a direction orthogonal to the Z-axis direction. In the present preferred embodiment, a +X side corresponds to a forward side of the vehicle, while a −X side corresponds to a rearward side of the vehicle. A Y-axis direction corresponds to a left-right direction of the vehicle, that is, a vehicle width direction, and is a direction orthogonal to both the X-axis direction and the Z-axis direction. In the present preferred embodiment described below, a +Y side corresponds to a left side of the vehicle, while a −Y side corresponds to a right side of the vehicle. The Y-axis direction corresponds to an axial direction of a motor axis J1 to be described later. Each of the front-rear direction and the left-right direction is a horizontal direction orthogonal to the vertical direction. In the present preferred embodiment, the +Y side corresponds to one side in the axial direction, and the −Y side corresponds to the other side in the axial direction.

The motor axis J1 shown appropriately in the drawings extends in the Y-axis direction, that is, the left-right direction of the vehicle. In the present preferred embodiment, unless otherwise specified, a direction parallel to the motor axis J1 will be simply referred to as an "axial direction", a radial direction with the motor axis J1 as a center will be simply referred to as a "radial direction", and a circumferential direction with the motor axis J1 as a center, that is, a direction about the motor axis J1 will be simply referred to as a "circumferential direction". In the present preferred embodiment, one side in the axial direction (+Y side) is a direction from a motor housing portion 61 to a gear housing portion 62 of a housing 6 to be described later in the axial direction. The other side in the axial direction (−Y side) is a direction from the gear housing portion 62 to the motor housing portion 61 in the axial direction. Note that, in the present preferred embodiment, the term "direction parallel" includes a direction substantially parallel, and the term "direction orthogonal to" includes a direction substantially orthogonal.

FIG. 1 is a conceptual diagram schematically illustrating the motor unit (drive apparatus) 1. The motor unit 1 according to the present preferred embodiment is mounted on a vehicle having a motor as a power source, such as a hybrid electric vehicle (HEV), a plug-in hybrid vehicle (PHV), or an electric vehicle (EV), and is used as the power source thereof.

The motor unit 1 includes a motor 2, a gear unit (transmission mechanism) 3 including a reduction gear 4 and a differential 5, a lock mechanism 80, the housing 6, oil O, and an oil passage 90. The oil passage 90 includes a first oil passage 91 and a second oil passage 92.

The housing 6 houses the motor 2, the gear unit 3, and the lock mechanism 80. The housing 6 includes the motor housing portion (motor room) 61 that houses the motor 2, the gear housing portion (gear room) 62 that houses the gear unit 3 and the lock mechanism 80, and a partition 61c provided between the motor housing portion 61 and the gear housing portion 62. The gear housing portion 62 is positioned on one side (+Y side) in the axial direction of the motor housing portion 61.

The motor housing portion 61 has a bottom portion 61s positioned below the motor 2. Similarly, the gear housing portion 62 has a bottom portion 62s positioned below the gear unit 3. The bottom portion 61s of the motor housing portion 61 is positioned higher than the bottom portion 62s of the gear housing portion 62.

The partition 61c partitions the motor housing portion 61 and the gear housing portion 62. The partition 61c extends along a plane orthogonal to the motor axis J1. A partition opening 68 is provided in the partition 61c. The partition opening 68 is arranged to connect the interior of the motor housing portion 61 and the interior of the gear housing portion 62 to each other.

The oil O is stored in the housing 6. The oil O is circulated in the oil passage 90. That is, the oil passage 90 circulates the oil O. The oil O functions as a refrigerant for cooling the motor 2, and also functions to lubricate the gear unit 3. An oil equivalent to a lubricating oil (ATF: Automatic Transmission Fluid) for an automatic transmission having a relatively low viscosity is preferably used as the oil O so that the oil O can perform functions of a lubricating oil and a cooling oil.

An oil pool P in which the oil O is gathered is provided in a lower region of an interior space of the gear housing portion 62. The oil O in the oil pool P is sent to the interior of the motor housing portion 61 through the oil passage 90. The oil O sent to the interior of the motor housing portion 61 drips to a lower region in the interior of the motor housing portion 61, then moves to the gear housing portion 62 via the partition opening 68, and returns to the oil pool P.

The motor 2 includes a rotor 20 and a stator 30. In the present preferred embodiment, the motor 2 is an inner-rotor motor. The rotor 20 is arranged to be capable of rotating about the motor axis J1 which extends in the horizontal direction. The rotor 20 includes a shaft (motor shaft, motor drive shaft, or rotation shaft) 21 and a rotor body 24. That is, the motor 2 includes the shaft 21. Although not illustrated in the drawings, the rotor body 24 includes a rotor core, and a rotor magnet fixed to the rotor core. A torque of the rotor 20 is transmitted to the gear unit 3.

The shaft 21 is arranged to extend in the axial direction with the motor axis J1 as a center. The shaft 21 is arranged to rotate about the motor axis J1. The shaft 21 is a hollow shaft including a hollow portion 22 defined therein. The shaft 21 includes a communicating hole 23 defined therein. The communicating hole 23 is arranged to extend in the radial direction to connect the hollow portion 22 to a space outside of the shaft 21.

The shaft 21 is arranged to extend over the motor housing portion 61 and the gear housing portion 62 of the housing 6. An end portion of the shaft 21 on the left side is arranged to protrude to the interior of the gear housing portion 62. A first gear 41, which will be described below, of the gear unit 3 is fixed to the end portion of the shaft 21 on the left side.

The stator 30 is arranged so as to face the rotor 20 in the radial direction with a gap therebetween. The stator 30 is arranged outside of the rotor 20 in the radial direction. An outer peripheral surface of the stator 30 faces an inner peripheral surface of the housing 6. The stator 30 includes a stator core 32 and coils 31 attached to the stator core 32. The stator core 32 is fixed to an inner surface of the motor housing portion 61. The coil 31 is attached to each tooth of the stator core 32 with an insulator (not shown) therebetween.

The gear unit 3 is housed in the gear housing portion 62 of the housing 6. The gear unit 3 is connected to the motor 2. More specifically, the gear unit 3 is connected on one side in the axial direction of the shaft 21. The gear unit 3 includes the reduction gear 4 and the differential 5. A torque outputted from the motor 2 is transmitted to the differential 5 through the reduction gear 4.

The reduction gear 4 is connected to the motor 2. The reduction gear 4 is arranged to increase the torque outputted from the motor 2 in accordance with a reduction ratio while reducing a rotation speed of the motor 2. The reduction gear 4 is arranged to transmit the torque outputted from the motor 2 to the differential 5. The reduction gear 4 includes the first gear 41, a second gear 42, a third gear 43, and an intermediate shaft 45.

The first gear 41 is fixed to an outer peripheral surface of the end portion of the shaft 21 on the left side. The first gear 41 is arranged to rotate about the motor axis J1 together with the shaft 21. The intermediate shaft 45 is arranged to extend along an intermediate axis J2 parallel to the motor axis J1. The intermediate shaft 45 is arranged to rotate about the intermediate axis J2. The second gear 42 and the third gear 43 are fixed to an outer peripheral surface of the intermediate shaft 45 at intervals in the axial direction. The second gear 42 and the third gear 43 are connected to each other through the intermediate shaft 45. The second gear 42 and the third gear 43 are arranged to rotate about the intermediate axis J2. The second gear 42 is arranged to mesh with the first gear 41. The third gear 43 is arranged to mesh with a ring gear 51, which will be described below, of the differential 5.

The torque outputted from the motor 2 is transmitted to the ring gear 51 of the differential 5 through, in order, the shaft 21, the first gear 41, the second gear 42, the intermediate shaft 45, and the third gear 43. The number of gears, the gear ratios of the gears, and the like can be appropriately changed in accordance with a desired reduction ratio. In the present preferred embodiment, the reduction gear 4 is a speed reducer of a parallel-axis gearing type, in which center axes of gears are arranged in parallel with each other.

The differential 5 is connected to the motor 2 through the reduction gear 4. The differential 5 is a device arranged to transmit the torque outputted from the motor 2 to wheels of the vehicle. The differential 5 is arranged to transmit the same torque to axles 55 of left and right wheels while absorbing a difference in speed between the left and right wheels when the vehicle is turning. Thus, in the present preferred embodiment, the gear unit 3 is arranged to transmit the torque of the motor 2 to the axles 55 of the vehicle through the reduction gear 4 and the differential 5. The differential 5 includes the ring gear 51, a gear housing (not shown), a pair of pinion gears (not shown), a pinion shaft (not shown), and a pair of side gears (not shown). The ring gear 51 is arranged to rotate about a differential axis J3 parallel to the motor axis J1. The torque outputted from the motor 2 is transmitted to the ring gear 51 through the reduction gear 4.

The lock mechanism 80 restricts the driving of the gear unit 3. The lock mechanism 80 can transition between a locked state and an unlocked state. The lock mechanism 80 locks the gear unit 3 in the locked state to suppress movement of the vehicle on which the motor unit 1 is mounted. On the other hand, the lock mechanism 80 does not restrict the driving of the gear unit 3 in the unlocked state.

Figure 2:
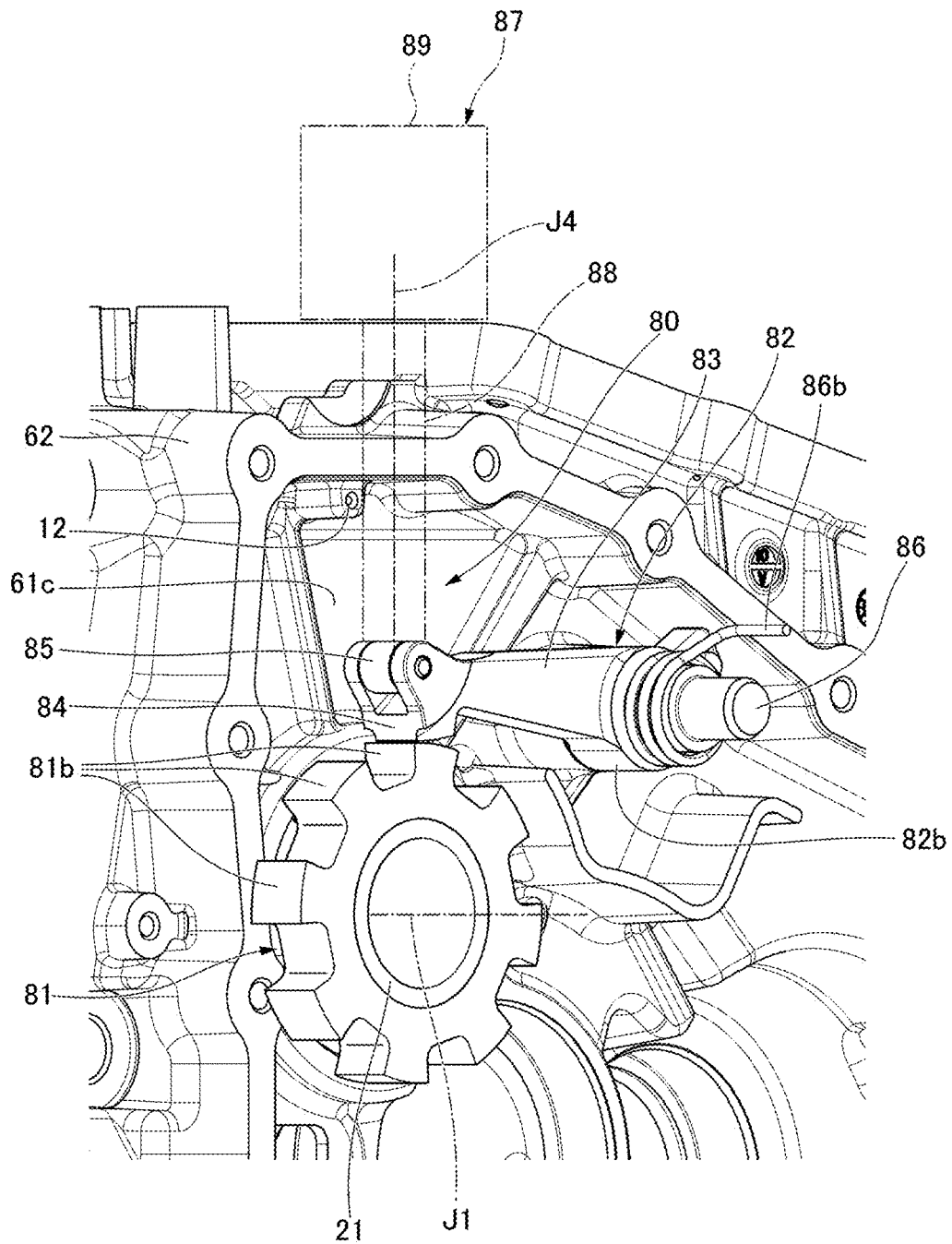
FIG. 2 is a perspective view of a lock mechanism and a housing according to the embodiment.

FIG. 2 is a perspective view illustrating a part of the lock mechanism 80 and the housing 6. The lock mechanism 80 includes a lock gear 81, a lock arm 82, a support shaft 86, and a drive unit 87. Note that, in FIG. 2, for ease of understanding, the drive unit 87 is indicated by a two-dot chain line. In FIG. 2, the lock mechanism 80 is in the unlocked state.

The lock gear 81 is provided on the outer peripheral surface of the shaft 21 of the transmission mechanism. The lock gear 81 according to the present preferred embodiment has an annular shape with the motor axis J1 as a center, and is fitted to the outer peripheral surface of the shaft 21. The lock gear 81 is arranged between the first gear 41 and the partition 61c in the axial direction. A plurality of tooth portions 81b arranged in the circumferential direction is provided on an outer periphery of the lock gear 81. The tooth portion 81b protrudes outward in the radial direction.

The support shaft 86 extends in parallel with the motor axis J1. The support shaft 86 rotatably supports the lock arm 82. A winding spring 86b is attached to the support shaft 86. The winding spring 86b applies an elastic force to the lock arm 82 in a direction of retracting a distal end side upward.

The lock arm 82 is arranged above the lock gear 81. The lock arm 82 includes a base end portion 82b supported by the support shaft 86, an arm body 83 extending from the base end portion 82b in the front-rear direction of the vehicle, and a meshing portion 84 and a coupling portion 85 positioned at a distal end of the arm body 83. The meshing portion 84 is arranged on a lower side with respect to the arm body 83. On the other hand, the coupling portion 85 is arranged on an upper side with respect to the arm body 83. The lock arm 82 is coupled to the drive unit 87 at the coupling portion 85.

The meshing portion 84 is positioned above the lock gear 81. The meshing portion 84 protrudes downward from the arm body 83. The meshing portion 84 faces an outer peripheral surface of the lock gear 81 from above. The lock arm 82 rotates about the support shaft 86, and thus, the meshing portion 84 moves in an upper-lower direction. In the lock mechanism 80 in the locked state, the meshing portion 84 is fitted between the tooth portions 81b of the lock gear 81. That is, the lock mechanism 80 includes the meshing portion 84 meshing with the tooth portion 81b of the lock gear 81 from above. In the lock mechanism 80 in the unlocked state, the meshing portion 84 retracts from the lock gear 81.

The drive unit 87 is positioned above the meshing portion 84. The drive unit 87 drives the lock arm 82 up and down. Accordingly, the drive unit 87 drives the meshing portion 84 up and down.

The drive unit 87 according to the present preferred embodiment is driven by electricity. That is, the lock mechanism 80 according to the present preferred embodiment is motorized. Accordingly, the operability of a driver is improved.

Note that the lock mechanism 80, which is an electrically-driven mechanism using a shift-by-wire system, may be replaced with a manual mechanism. That is, the meshing portion 84 may be driven by the driver mechanically pulling a wire connected to a parking lever.

The drive unit 87 includes a drive shaft 88 and an actuator 89. The drive shaft 88 extends in the upper-lower direction with a drive unit axis J4 extending in the upper-lower direction as a center. The drive shaft 88 is coupled to the actuator 89 at an upper end portion, and coupled to the coupling portion 85 of the lock arm 82 at a lower end portion.

The actuator 89 drives the drive shaft 88 up and down along the drive unit axis J4. The actuator 89 according to the present preferred embodiment is, for example, a solenoid actuator. Note that, in the present preferred embodiment, the case where the actuator 89 linearly moves the drive shaft 88 along the drive unit axis J4 has been described, but other motions may be performed.

According to the present preferred embodiment, the lock mechanism 80 is attached to the shaft 21. A power of the motor 2 is outputted from the shaft 21 while a speed is gradually reduced by each gear of the gear unit 3. Thus, the torques transmitted by the shaft 21, the intermediate shaft 45, and the axles 55 are increased in this order. That is, the transmission torque is the smallest in the shaft 21. Thus, the lock mechanism 80 is attached to the shaft 21, and thus, the torque for restricting the rotation of the lock mechanism 80 can be reduced. Accordingly, the lock mechanism 80 can be downsized. The lock mechanism 80 is attached to the shaft 21, and thus, the lock mechanism 80 can be arranged to overlap the motor 2 when viewed from the axial direction. Accordingly, a projection area of the motor unit 1 in the axial direction can be reduced, and the motor unit 1 can be downsized. Note that these effects can be obtained as long as the shaft of which the rotation is restricted by the lock mechanism 80 is a shaft that is connected to the rotor 20 of the motor 2 and rotates around the motor axis J1 together with the rotor 20.

According to the lock mechanism 80 according to the present preferred embodiment, the drive unit 87, the meshing portion 84, and the lock gear 81 are arranged in the upper-lower direction. Thus, the lock mechanism 80 is downsized in the front-rear direction of the vehicle, and an increase in a dimension of the motor unit 1 in the front-rear direction of the vehicle is further suppressed.

The oil passage 90 passes through the housing 6 and circulates the oil O. The oil passage 90 is a channel of the oil O along which the oil O is fed from the oil pool P to the gear unit 3 and the motor 2 and is led back to the oil pool P. The oil passage 90 is arranged to extend over both the interior of the motor housing portion 61 and the interior of the gear housing portion 62.

Note that the term "oil passage" as used herein refers to a channel of an oil. The concept "oil passage" includes not only a "flow passage" in which a flow of an oil in one direction is steady, but also a channel in which the oil is allowed to temporarily stay and a channel along which the oil drips. Examples of the channel in which the oil is allowed to temporarily stay include a reservoir arranged to store the oil.

The oil passage 90 includes the first oil passage 91 and the second oil passage 92. Each of the first oil passage 91 and the second oil passage 92 is arranged to circulate the oil O in the interior of the housing 6.

First, a common portion between the first oil passage 91 and the second oil passage 92 will be described. Each of the first oil passage 91 and the second oil passage 92 is a channel along which the oil O is fed from the oil pool P to the motor 2 and back into the oil pool P. In each of the first oil passage 91 and the second oil passage 92, the oil O drips from the motor 2 to be gathered in the lower region of the motor housing portion 61. The oil O gathered in the lower region of the motor housing portion 61 moves to the lower region of the gear housing portion 62 (that is, the oil pool P) through the partition opening 68. That is, the first oil passage 91 and the second oil passage 92 include channels for moving the oil O from the lower region in the motor housing portion 61 to the lower region in the gear housing portion 62.

The first oil passage 91 includes a scraping-up channel 91$u$, a shaft feed channel 91$d$, an intra-shaft channel 91$t$, and an intra-rotor channel 91$q$. A reservoir 93 is arranged in the channel of the first oil passage 91. The reservoir 93 is arranged in the interior of the gear housing portion 62.

The scraping-up channel 91$u$ is a channel along which the oil O is scraped up from the oil pool P by rotation of the ring gear 51 of the differential 5 to be received by the reservoir 93. The reservoir 93 is arranged to open upward. The reservoir 93 receives a portion of the oil O which has been scraped up by the ring gear 51. The reservoir 93 also receives portions of the oil O which have been scraped up by the second gear 42 and the third gear 43 in addition to the ring gear 51 when a liquid surface S of the oil pool P is at a high level, for example, immediately after the motor 2 is driven.

In the scraping-up channel 91$u$, the oil O which have been scraped up by the ring gear 51 is fed to each gear of the gear unit 3 and spreads over a tooth surface of the gear. According to the present preferred embodiment, the oil passage 90 passes through the interior of the gear housing portion 62. Accordingly, the oil O can be used not only for cooling the motor 2 but also for lubricating the gears and bearings of the gear unit 3.

The shaft feed channel 91$d$ is arranged to lead the oil O from the reservoir 93 into the hollow portion 22 of the shaft 21. The intra-shaft channel 91$t$ is a channel along which the oil O passes in the hollow portion 22 of the shaft 21. The intra-rotor channel 91$q$ is a channel of the oil O along which the oil passes through the communicating hole 23 of the shaft 21 and an interior of the rotor body 24, and is scattered to the stator 30.

In the intra-shaft channel 91$t$, a centrifugal force acts on the oil O in the interior of the rotor 20 due to the rotation of the rotor 20. Accordingly, the oil O is continuously scattered outward in the radial direction from the rotor 20. The scattering of the oil O generates a negative pressure in a channel in the interior of the rotor 20, causing the oil O gathered in the reservoir 93 to be sucked into the interior of the rotor 20, so that the channel in the interior of the rotor 20 is filled with the oil O. A portion of the oil O which has reached the stator 30 absorbs heat from the stator 30.

In the second oil passage 92, the oil O is lifted from the oil pool P, and is fed to the stator 30 and the lock mechanism 80. The second oil passage 92 includes a pump 96, a cooler 97, a first feed flow passage 11, and a second feed flow passage 12. The first feed flow passage 11 feeds the oil O to the motor 2. The oil O fed to the motor 2 cools the motor 2. On the other hand, the second feed flow passage 12 feeds the oil O to the lock mechanism 80. The oil O fed to the lock mechanism 80 enhances lubricity of the lock mechanism 80.

Here, the first feed flow passage 11 and the second feed flow passage 12 are "flow passages" through which the oil O flows in a constant flow in one direction. Thus, the first feed flow passage 11 and the second feed flow passage 12 are concepts that do not include a channel through which the oil is scraped up by the gear and is fed to a target site.

In the first feed flow passage 11, the pump 96, the cooler 97, and a feed pipe 10 are provided. The first feed flow passage 11 includes a first flow passage 11$u$, a second flow passage 11$d$, a third flow passage 11$t$, a fourth flow passage (intra-wall flow passage) 11$q$, an intra-feed-pipe flow passage (motor feed flow passage) 11$c$, and jet holes 11$s$.

The first flow passage 11$u$, the second flow passage 11$d$, the third flow passage 11$t$, and the fourth flow passage 11$q$ are provided in a wall of the housing 6. The first flow passage 11$u$ is arranged to connect the oil pool P and the pump 96 to each other. The second flow passage 11$d$ is arranged to connect the pump 96 and the cooler 97 to each other. The third flow passage 11$t$ is arranged to connect the cooler 97 and the fourth flow passage 11$q$ to each other. The third flow passage 11$t$ is provided in a wall portion of the motor housing portion 61 that surrounds the motor 2 from the outside in the radial direction.

The fourth flow passage 11$q$ extends along a wall surface in an interior of the partition 61$c$. The fourth flow passage 11$q$ is connected to the feed pipe 10. That is, the fourth flow passage 11$q$ is arranged to connect the third flow passage 11$t$ and the feed pipe 10. A specific configuration of the fourth flow passage 11$q$ will be described in detail later.

The intra-feed-pipe flow passage 11$c$ feeds the oil O to the motor 2 from above. The intra-feed-pipe flow passage 11$c$ is a flow passage of the oil O in an interior of the feed pipe 10. The intra-feed-pipe flow passage 11$c$ extends from the fourth flow passage 11$q$ to the other side in the axial direction. Although not illustrated in FIG. 1, two feed pipes 10 extending in parallel are provided in the second oil passage 92 according to the present preferred embodiment. Accordingly, the first feed flow passage 11 has two intra-feed-pipe flow passages 11$c$.

The feed pipe 10 has a pipe shape extending in the axial direction. The feed pipe 10 is arranged between an inner peripheral surface of the motor housing portion 61 and the outer peripheral surface of the stator 30. The feed pipe 10 is positioned above the stator 30. An end portion on a base end side (one side in the axial direction) of the feed pipe 10 is fixed to the partition 61$c$. An end portion on a distal end side (the other side in the axial direction) of the feed pipe 10 is fixed to the inner peripheral surface of the motor housing portion 61.

The feed pipe 10 has a plurality of jet holes 11$s$ penetrating a peripheral wall. The jet hole 11$s$ allows the interior and an exterior of the feed pipe 10 to communicate with each other. The jet hole 11$s$ jets the oil O flowing through the intra-feed-pipe flow passage 11$c$ to the motor 2. The plurality of jet holes 11$s$ is arranged in the axial direction at intervals. Since the oil O is jetted from each of the plurality of jet holes 11$s$, the oil O cools the motor 2 over a wide range.

The pump 96 pumps the oil O in the second oil passage 92. In the present preferred embodiment, the oil pump 96 is an electric pump driven by electricity. The pump 96 is provided in a lower portion of the motor unit 1. The pump 96 sucks up the oil O from the oil pool P through the first flow passage 11$u$, and feeds the oil O to the fourth flow passage 11$q$ through the second flow passage 11$d$, the cooler 97, and the third flow passage 11$t$.

The first flow passage 11$u$ and the second flow passage 11$d$ are connected to the cooler 97. The first flow passage 11$u$ and the second flow passage 11$d$ are connected to each other through an internal flow passage of the cooler 97. A cooling water pipe 98, in which cooling water cooled by a radiator (not shown) is caused to pass, is connected to the cooler 97. A portion of the oil O which passes through an interior of the cooler 97 is cooled through heat exchange with the cooling water passing through the cooling water pipe 98. An inverter (not shown) for controlling the motor 2 may be arranged in the channel of the cooling water pipe 98. In this case, the cooling water passing through the cooling water pipe 98 cools the inverter in addition to the oil O.

The second feed flow passage 12 branches and extends from the first feed flow passage 11 on a downstream side of the pump 96. The second feed flow passage 12 is defined in the partition 61c. The second feed flow passage 12 extends from the fourth flow passage 11q of the first feed flow passage 11 to one side in the axial direction so as to penetrate the partition 61c. The second feed flow passage 12 opens toward the interior of the gear housing portion 62. According to the present preferred embodiment, the second feed flow passage 12 can be easily molded by punching the partition 61c in a plate thickness direction. In the present preferred embodiment, the oil O is sucked up from the oil pool P, and the second flow passage 11d, the cooler 97, and the second oil passage 92 feed the oil O to the fourth flow passage 11q via the third flow passage 11t. Here, in the second oil passage 92, among the second flow passage 11d, the cooler 97, the third flow passage 11t, and the fourth flow passage 11q, a flow passage close to the oil pool P is defined as an upstream side, and a flow passage farther than the oil pool P is defined as a downstream side.

As illustrated in FIG. 2, an opening of the second feed flow passage 12 faces the lock mechanism 80. The oil O flowing through the second feed flow passage 12 is jetted toward the lock mechanism 80 through the second feed flow passage 12. The oil O jetted to the lock mechanism 80 drips downward along a surface of the lock mechanism 80 while enhancing the lubricity of the lock mechanism 80, and returns to the oil pool P.

The lock mechanism 80 is locked by the driver when the vehicle is parked. In this state, the vehicle is left for a long period of time, the lubricity of a contact portion between the members of the lock mechanism 80 may deteriorate, and the lock mechanism 80 may not be smoothly unlocked. When the lock mechanism 80 is not unlocked, the shafts and the gears of the gear unit 3 are not driven. As long as the lock mechanism 80 is not unlocked, the oil O is not scraped up by the gears and is not fed to the lock mechanism 80.

According to the present preferred embodiment, the lock mechanism 80 feeds the oil O by the feed channel (the second oil passage 92) that does not depend on the driving of the motor 2 and the gear unit 3. Thus, before the motor 2 is driven, the lubricity of the lock mechanism 80 is sufficiently enhanced, and thus, the lock mechanism 80 can be operated smoothly.

According to the present preferred embodiment, the oil O is fed to the motor 2 via the first feed flow passage 11 to cool the motor 2. The oil O is fed to the lock mechanism 80 via the second feed flow passage 12 to enhance the lubricity of the lock mechanism 80. That is, according to the present preferred embodiment, the oil O flowing through the second oil passage 92 is used as both the refrigerant of the motor 2 and the lubricating oil of the lock mechanism 80.

According to the present preferred embodiment, the feed flow passage (second feed flow passage 12) of the oil O for the lock mechanism 80 is provided at the second oil passage 92. Thus, it is not necessary to arrange the lock mechanism 80 in the lower region of the gear housing portion 62 as compared with a case where the lock mechanism 80 is immersed in the oil pool P to improve the lubricity of the lock mechanism, and thus, a degree of freedom in the arrangement of the lock mechanism 80 is enhanced. More specifically, the lock mechanism 80 can be attached to the shaft 21 rotating with a low torque, and the lock mechanism 80 can be downsized.

According to the present preferred embodiment, the second feed flow passage 12 branches and extends from the first feed flow passage 11 on the downstream side of the pump 96. Accordingly, the pump 96 pumps the oil O in the first feed flow passage 11 and the second feed flow passage 12. According to the present preferred embodiment, the second oil passage 92 can feed the oil O to the motor 2 and the lock mechanism 80 by one pump 96.

Figure 3:
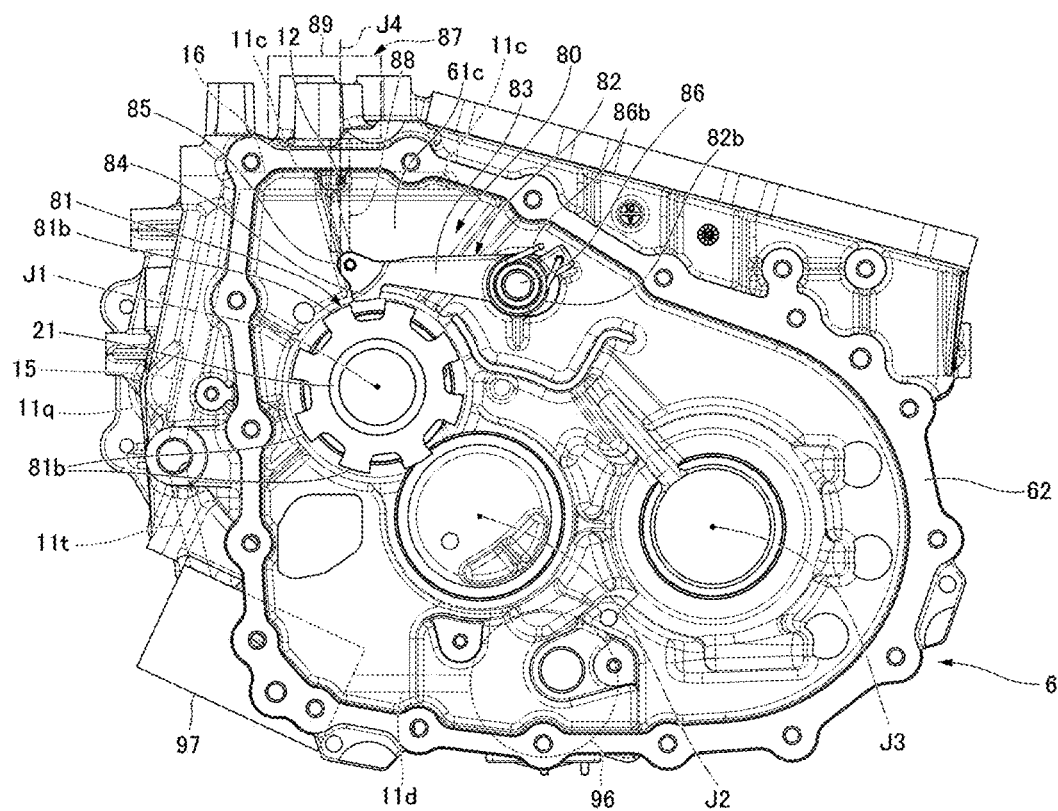
FIG. 3 is a front view of the lock mechanism and the housing according to the embodiment.

FIG. 3 is a front view of the lock mechanism 80 and the housing 6. In FIG. 3, the first feed flow passage 11 and the second feed flow passage 12 provided in the partition 61c are indicated by broken lines. In FIG. 3, the drive unit 87 is indicated by a two-dot chain line for ease of understanding.

The second feed flow passage 12 extends toward the drive shaft 88 of the lock mechanism 80. That is, the opening of the second feed flow passage 12 overlaps the drive shaft 88 when viewed from an opening direction of the second feed flow passage 12. The meshing portion 84 of the lock arm 82 and the lock gear 81 are arranged below the drive shaft 88. Thus, the oil O jetted from the opening of the second feed flow passage 12 is fed to the meshing portion 84 and the lock gear 81 along a surface of the drive shaft 88.

According to the present preferred embodiment, the opening of the second feed flow passage 12 and the drive unit 87 overlap when viewed from the opening direction of the second feed flow passage 12. Accordingly, the oil O is fed not only to the drive unit 87 but also to the meshing portion 84 and the lock gear 81 positioned below the drive unit 87. Accordingly, the oil O can enhance lubricity of various portions of the lock mechanism 80. In particular, in the present preferred embodiment, the drive shaft 88 extends in the upper-lower direction. Thus, the oil O flowing along the surface of the drive shaft 88 is reliably fed to the meshing portion 84 positioned immediately below the drive shaft 88. Thus, the lubricity between the meshing portion 84 and the lock gear 81 can be enhanced without depending on an inclination of the vehicle or the like. According to the present preferred embodiment, since the opening of the second feed flow passage 12 is positioned higher than the lock gear 81, the oil O can be fed to a wide range of the lock gear 81 by using gravity.

As illustrated in FIG. 3, the fourth flow passage 11q of the second feed flow passage 12 has a first channel 15 and a second channel 16. The first channel 15 is arranged on an upstream side of the second channel 16. Each of the first channel 15 and the second channel 16 extends linearly. The first channel 15 and the second channel 16 are connected to each other. Each of the first channel 15 and the second channel 16 is molded by punching the partition 61c along the wall surface.

The first channel 15 extends from the pump 96 side to an upper side of the motor 2. The second channel 16 extends in the horizontal direction. The second channel 16 is connected to the first channel 15 and the two intra-feed-pipe flow passages 11c.

The second feed flow passage 12 is connected to the second channel 16 between connection portions of the two intra-feed-pipe flow passages 11c. The two intra-feed-pipe flow passages 11c extend from the partition 61c to the other side in the axial direction. On the other hand, the second feed flow passage 12 extends from the partition 61c to one side in the axial direction.

According to the present preferred embodiment, the pump 96 is provided in the lower portion of the motor unit 1. The first channel 15 extends from the pump 96 side to above the motor 2, and the second channel 16 extends horizontally from the first channel 15. The two intra-feed-pipe flow passages 11c and the first channel 15 are connected to the second channel 16. Accordingly, the oil O can be fed from above the motor 2 and the lock mechanism 80 to the lower side in a weight direction.

Next, various modification examples of the present preferred embodiment will be described with reference to a conceptual configuration diagram. In each modification example, the configuration of the second feed flow passage 12 is mainly different. Note that members or portions that have their equivalents in the above-described preferred embodiment are denoted by the same reference numerals as those of their equivalents in the above-described preferred embodiment, and descriptions of those members or portions are omitted.

Figure 4:
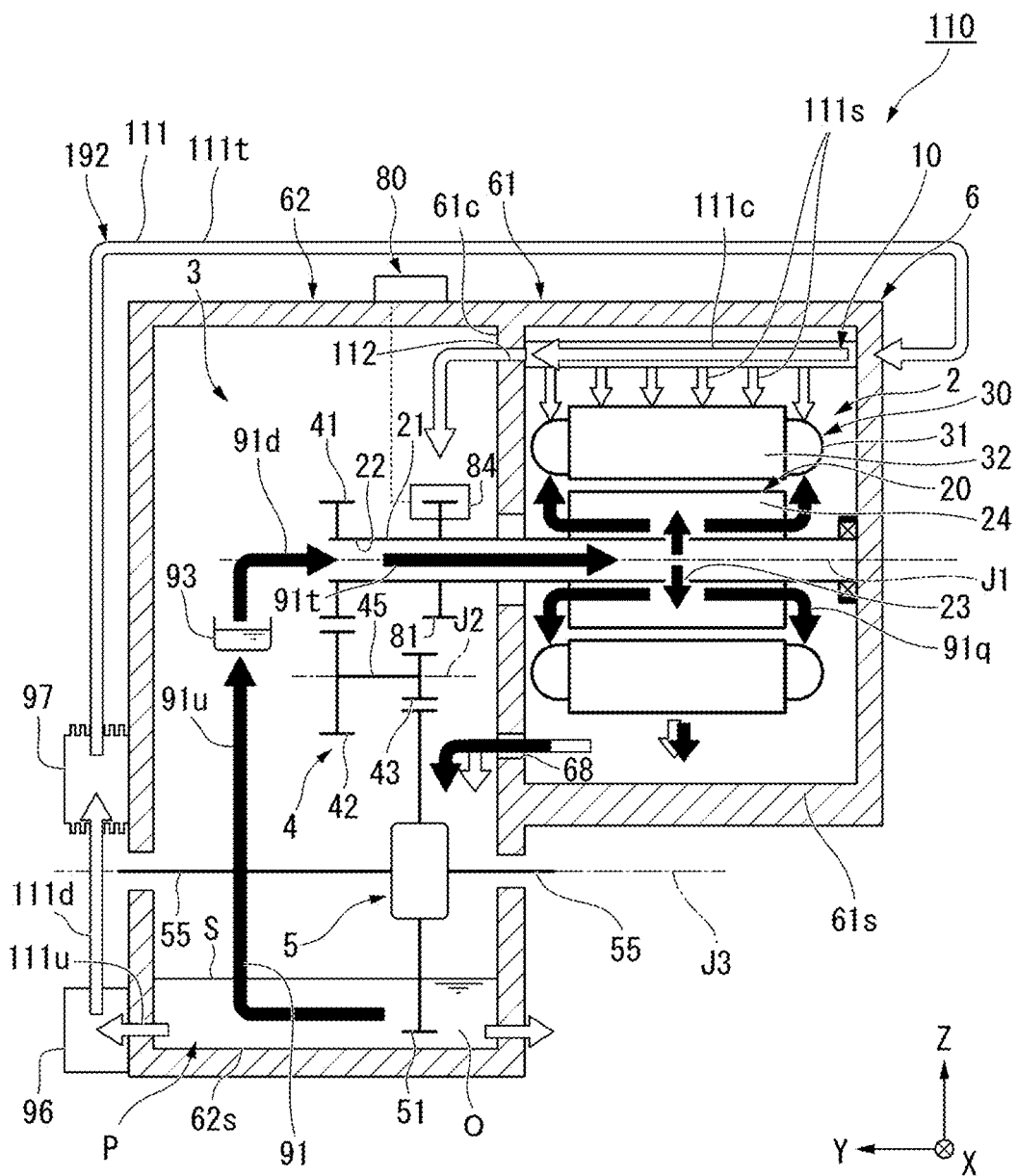
FIG. 4 is a conceptual configuration diagram of a motor unit according to Modification Example 1.

FIG. 4 is a conceptual configuration diagram of a motor unit (drive apparatus) 101 according to Modification Example 1.

As in the above-described preferred embodiment, a second oil passage 192 includes the pump 96, the cooler 97, a first feed flow passage 111 that feeds the oil O to the motor 2, and a second feed flow passage 112 that feeds the oil O to the lock mechanism 80.

In the first feed flow passage 111 according to the present modification example, the pump 96, the cooler 97, and the feed pipe 10 are provided. The first feed flow passage 111 includes a first flow passage 111u, a second flow passage 111d, a third flow passage 111t, an intra-feed-pipe flow passage (motor feed flow passage) 111c, and jet holes 111s.

The first flow passage 111u, the second flow passage 111d, and the third flow passage 111t pass through an exterior of the housing 6. The first flow passage 111u is arranged to connect the oil pool P and the pump 96 to each other. The second flow passage 111d is arranged to connect the pump 96 and the cooler 97 to each other. The third flow passage 111t is arranged to connect the cooler 97 and the intra-feed-pipe flow passage 111c. The third flow passage 111t is connected to the housing 6 from the other side in the axial direction of the housing 6.

The feed pipe 10 is arranged in the interior of the motor housing portion 61 and above the motor 2. In the interior of the feed pipe 10, the intra-feed-pipe flow passage 111c is provided. The third flow passage 111t is connected to the intra-feed-pipe flow passage 111c.

The intra-feed-pipe flow passage 111c is a flow passage of the oil O flowing from the other side in the axial direction toward the one side in the axial direction. The feed pipe 10 has a plurality of jet holes 111s. The jet hole 111s jets the oil O flowing through the intra-feed-pipe flow passage 111c to the motor 2. The feed pipe 10 is connected to the partition 61c on a downstream side of the oil O. The second feed flow passage 112 is provided at the partition 61c. The second feed flow passage 112 penetrates the partition 61c in the axial direction. An opening of the second feed flow passage 112 faces the lock mechanism 80. The oil O flowing through the second feed flow passage 112 is jetted toward the lock mechanism 80 in the gear housing portion 62.

According to the present modification example, the second feed flow passage 112 is connected to an end on a downstream side of the first feed flow passage 111. According to the present modification example, a part of the first feed flow passage 111 passes through the exterior of the housing 6. The first feed flow passage 111 and the second feed flow passage 112 may have configurations shown in the present modification example.

Figure 5:
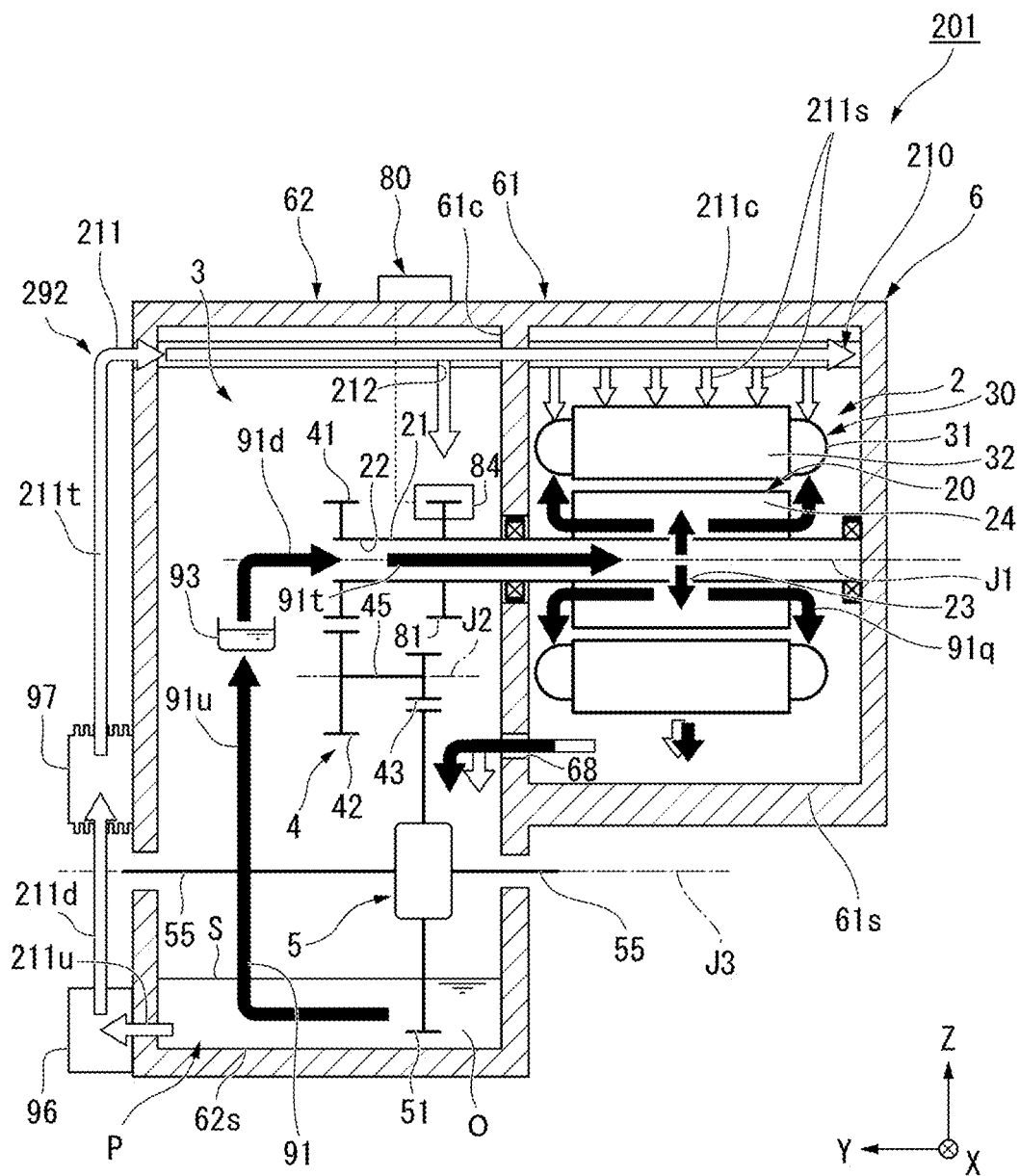
FIG. 5 is a conceptual configuration diagram of a motor unit of Modification Example 2.

FIG. 5 is a conceptual configuration diagram of a motor unit (drive apparatus) 201 of Modification Example 2.

As in the above-described preferred embodiment, a second oil passage 292 includes the pump 96, the cooler 97, a first feed flow passage 211 that feeds the oil O to the motor 2, and a second feed flow passage 212 that feeds the oil O to the lock mechanism 80.

In the first feed flow passage 211 according to the present modification example, the pump 96, the cooler 97, and a feed pipe 210 are provided. The first feed flow passage 211 includes a first flow passage 211u, a second flow passage 211d, a third flow passage 211t, an intra-feed-pipe flow passage (motor feed flow passage) 211c, and jet holes 211s.

The first flow passage 211u, the second flow passage 211d, and the third flow passage 211t pass through the exterior of the housing 6. The first flow passage 211u is arranged to connect the oil pool P and the pump 96 to each other. The second flow passage 211d is arranged to connect the pump 96 and the cooler 97 to each other. The third flow passage 211t is arranged to connect the cooler 97 and the intra-feed-pipe flow passage 211c. The third flow passage 211t is connected to the housing 6 from one side in the axial direction of the housing 6.

The feed pipe 210 is arranged in the interior of the housing 6. The feed pipe 210 extends in the axial direction. The feed pipe 210 penetrates the partition 61c. The feed pipe 210 extends over the motor housing portion 61 and the gear housing portion 62. The feed pipe 210 is arranged above the lock mechanism 80 and above the motor 2 in the interior of the gear housing portion 62 and the motor housing portion 61. In the interior of the feed pipe 210, the intra-feed-pipe flow passage 211c is provided. The third flow passage 211t is connected to the intra-feed-pipe flow passage 211c.

The intra-feed-pipe flow passage 211c is a flow passage of the oil O flowing from one side in the axial direction toward the other side in the axial direction. The intra-feed-pipe flow passage 211c passes through the upper region in the gear housing portion 62 and the upper region in the motor housing portion 61. The second feed flow passage 212 opens in a region of the intra-feed-pipe flow passage 211c passing through the gear housing portion 62. On the other hand, the jet hole 211s opens in a region of the intra-feed-pipe flow passage 211c passing through the motor housing portion 61.

An opening of the second feed flow passage 212 is positioned immediately above the lock mechanism 80. The opening of the second feed flow passage 212 jets the oil O toward the lock mechanism 80. The jet hole 211s jets the oil O flowing through the intra-feed-pipe flow passage 211c to the motor 2.

According to the present modification example, the second feed flow passage 212 for feeding the oil O to the lock mechanism 80 is an opening provided in the feed pipe 210. According to the present modification example, a part of the first feed flow passage 211 passes through the exterior of the housing 6. The first feed flow passage 211 and the second feed flow passage 212 may have configurations shown in the present modification example.

Figure 6:
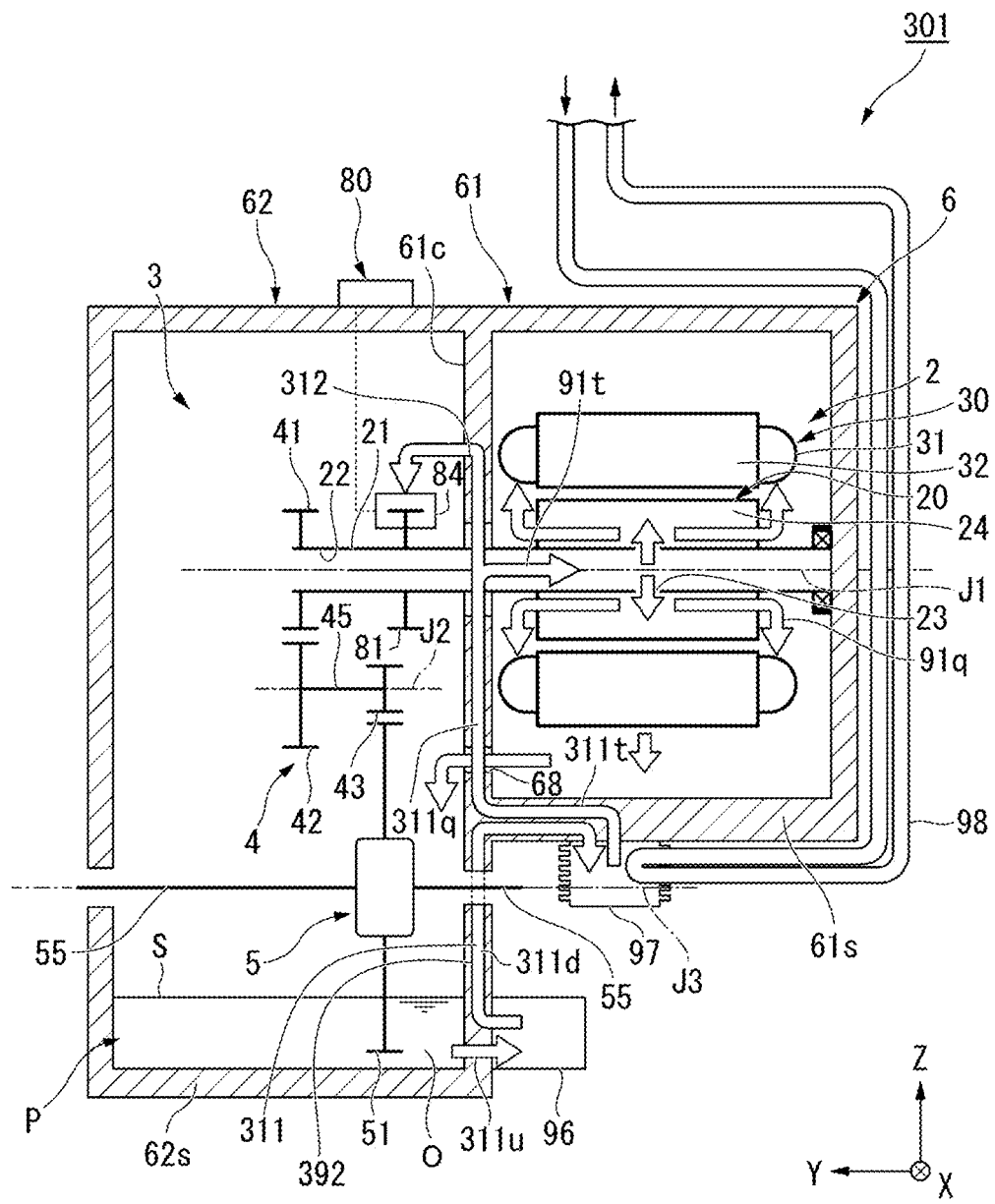
FIG. 6 is a conceptual configuration diagram of a motor unit of Modification Example 3.

FIG. 6 is a conceptual configuration diagram of a motor unit (drive apparatus) 301 of Modification Example 3.

As in the above-described preferred embodiment, an oil passage 392 includes the pump 96, the cooler 97, a first feed flow passage 311 that feeds the oil O to the motor 2, and a second feed flow passage 312 that feeds the oil O to the lock mechanism 80.

In the first feed flow passage 311 according to the present modification example, the pump 96 and the cooler 97 are provided. The first feed flow passage 311 includes a first flow passage 311u, a second flow passage 311d, a third flow passage 311t, a fourth flow passage (intra-wall flow passage) 311q, the intra-shaft channel 91t, and the intra-rotor channel 91q.

The first flow passage 311u, the second flow passage 311d, the third flow passage 311t, and the fourth flow passage 311q are provided in the wall of the housing 6. The first flow passage 311u is arranged to connect the oil pool P and the pump 96 to each other. The second flow passage 311d is arranged to connect the pump 96 and the cooler 97 to each other. The third flow passage 311t is arranged to connect the cooler 97 and the fourth flow passage 311q to each other. The fourth flow passage 311q extends along the wall surface in the interior of the partition 61c. The fourth flow passage 311q is connected to the intra-shaft channel 91t. The intra-shaft channel 91t is a channel along which the oil O passes in the hollow portion 22 of the shaft 21. The intra-rotor channel 91q is a channel of the oil O along which the oil passes through the communicating hole 23 of the shaft 21 and an interior of the rotor body 24, and is scattered to the stator 30.

The second feed flow passage 312 branches and extends from the first feed flow passage 311 on the downstream side of the pump 96. The second feed flow passage 312 is defined in the partition 61c. The second feed flow passage 312 extends from the fourth flow passage 311q of the first feed flow passage 311 to one side in the axial direction so as to penetrate the partition 61c. The second feed flow passage 312 opens toward the interior of the gear housing portion 62. An opening of the second feed flow passage 312 faces the lock mechanism 80. The oil O flowing through the second feed flow passage 312 is jetted toward the lock mechanism 80 in the gear housing portion 62.

According to the present modification example, the first feed flow passage 311 cools the motor 2 from the interior of the rotor 20. The second feed flow passage 312 branches from the first feed flow passage 311. The first feed flow passage 311 and the second feed flow passage 312 may have configurations shown in the present modification example.

In addition, the configurations (members or portions) described in the above-described preferred embodiment, modification examples, and notes may be combined without departing from the gist of the present invention, and addition, omission, substitution, and other modifications of the configurations are possible. In addition, the present invention is not limited by the above-described preferred embodiment and the like, and is limited only by the claims.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus, comprising:
    a motor that has a motor shaft extending in an axial direction;
    a transmission mechanism that is connected on one side in the axial direction of the motor shaft;
    a lock mechanism that restricts driving of the transmission mechanism;
    a housing that houses the motor, the transmission mechanism, and the lock mechanism;
    an oil that is stored in the housing; and
    an oil passage that circulates the oil, wherein
    the housing includes:
        a motor room that houses the motor,
        a gear room that houses the transmission mechanism and the lock mechanism, and
        a partition that is provided between the motor room and the gear room, and
    the oil passage includes:
        a pump that pumps the oil in the oil passage,
        a first feed flow passage that feeds the oil to the motor, and
        a second feed flow passage that feeds the oil to the lock mechanism,
    the first feed flow passage includes:
        a motor feed flow passage feeding the oil to the motor, and
        a flow passage, which connects the gear room to the motor feed flow passage, and is connected to the motor feed flow passage on the other side in the axial direction,
    the second feed flow passage penetrates the partition in the axial direction, and
    the first feed flow passage is connected to the second feed flow passage provided in the partition.

2. The drive apparatus according to claim 1, wherein the lock mechanism restricts rotation of the motor shaft connected to a rotor of the motor.

3. The drive apparatus according to claim 1, wherein
    the lock mechanism includes:
        a lock gear that is provided on an outer peripheral surface of a rotation shaft of the transmission mechanism,
        a meshing portion that is positioned above the lock gear and meshes with a tooth portion of the lock gear from above, and
        a drive unit that is positioned above the meshing portion, and drives the meshing portion up and down.

4. The drive apparatus according to claim 3, wherein an opening of the second feed flow passage is positioned higher than the lock gear.

5. The drive apparatus according to claim 3, wherein an opening of the second feed flow passage and the drive unit overlap in the axial direction when viewed in an opening direction of the second feed flow passage.

6. The drive apparatus according to claim 3, wherein
    the drive unit, the meshing portion, and the lock gear are arranged in an upper-lower direction of the drive apparatus.

7. The drive apparatus according to claim 3, wherein
    an opening of the second feed flow passage is provided outward from the lock gear in a radial direction of the motor shaft.

8. The drive apparatus according to claim 3, wherein
    the rotation shaft and the motor shaft are formed as an integral member.

9. The drive apparatus according to claim 1, wherein the pump is an electric pump.

10. The drive apparatus according to claim 1, wherein
    the motor feed flow passage is connected,
        on the one side in the axial direction, to the second feed flow passage provided in the partition, and
        on the other side in the axial direction, to the flow passage.

11. The drive apparatus according to claim 1, wherein an oil pool in which the oil is gathered is provided in the gear room, the pump, a cooler, and a feed pipe are provided in the first feed flow passage, and the first feed flow passage includes:
- a first flow passage that connects the oil pool and the pump,
- a second flow passage that connects the pump and the cooler, and
- a third flow passage that connects the cooler and the motor feed flow passage.

12. The drive apparatus according to claim 1, wherein the second feed flow passage is connected to an end on a downstream side of the first feed flow passage.

13. The drive apparatus according to claim 1, wherein a part of the first feed flow passage passes through an exterior of the housing.

14. The drive apparatus according to claim 1, wherein a feed pipe is provided in the first feed flow passage, and arranged in the motor room and above the motor.

15. The drive apparatus according to claim 14, wherein the feed pipe has a jet hole.

16. The drive apparatus according to claim 1, wherein the first feed flow passage includes a fourth flow passage that extends along a wall surface in an interior of the partition.

17. The drive apparatus according to claim 1, wherein the pump is provided in a lower portion of the housing.

18. The drive apparatus according to claim 1, wherein the pump is provided on an outside wall of the housing surrounding the gear room.

* * * * *